US012298703B2

(12) United States Patent
Takeuchi et al.

(10) Patent No.: US 12,298,703 B2

(45) Date of Patent: May 13, 2025

(54) CARTRIDGE INCLUDING PHOTOSENSITIVE DRUM AND DEVELOPING ROLLER THAT CAN BE EASILY SEPARATED

(71) Applicant: CANON KABUSHIKI KAISHA, Tokyo (JP)

(72) Inventors: Toshiaki Takeuchi, Shizuoka (JP); Koichi Ooishi, Shizuoka (JP); Hiroki Shimizu, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/751,474

(22) Filed: Jun. 24, 2024

(65) Prior Publication Data

US 2024/0345536 A1 Oct. 17, 2024

Related U.S. Application Data

(63) Continuation of application No. 18/461,819, filed on Sep. 6, 2023, now Pat. No. 12,045,004, which is a (Continued)

(30) Foreign Application Priority Data

Sep. 17, 2019 (JP) ................................ 2019-168869
Jul. 31, 2020 (JP) ................................ 2020-129837

(51) Int. Cl.

*G03G 15/08* (2006.01)
*G03G 21/16* (2006.01)
*G03G 21/18* (2006.01)

(52) U.S. Cl.

CPC ..... *G03G 21/1676* (2013.01); *G03G 15/0808* (2013.01); *G03G 21/1821* (2013.01); (Continued)

(58) Field of Classification Search

CPC .............. G03G 15/0808; G03G 21/14; G03G 21/1676; G03G 21/18; G03G 21/1814; (Continued)

(56) References Cited

U.S. PATENT DOCUMENTS 6,151,041 A 11/2000 Bolash
7,020,416 B2 3/2006 Kato et al.
(Continued)

FOREIGN PATENT DOCUMENTS

CN 101046673 A 10/2007
CN 103080851 A 5/2013
(Continued)

OTHER PUBLICATIONS

Extended European Search Report issued in European Appln. No. 20196129.9 mailed Feb. 24, 2021.
(Continued)

*Primary Examiner* — Sophia S Chen
(74) *Attorney, Agent, or Firm* — ROSSI, KIMMS & McDOWELL LLP

(57) ABSTRACT

A cartridge including: a first unit including an image bearing member and a first portion, and configured to take a removal posture when the cartridge is to be removed from a main body; a second unit including a developer bearing member and a second portion, the second unit being movable between a first position where the developer bearing member is in contact with the image bearing member and a second position where the developer bearing member is separated from the image bearing member and where the second portion is in contact with the first portion, wherein when the first unit takes the removal posture, the second unit is located at the second position, and when the second unit is located at the second position, movement of the second
(Continued)

unit in a direction, in which the developer bearing member is separated from the image bearing member, is restricted.

8 Claims, 8 Drawing Sheets

Related U.S. Application Data continuation of application No. 17/957,085, filed on Sep. 30, 2022, now Pat. No. 11,789,401, which is a continuation of application No. 17/377,750, filed on Jul. 16, 2021, now Pat. No. 11,493,878, which is a continuation of application No. 17/021,228, filed on Sep. 15, 2020, now Pat. No. 11,188,021.

(52) U.S. Cl.
CPC ... *G03G 21/1828* (2013.01); *G03G 2221/163* (2013.01); *G03G 2221/1861* (2013.01)

(58) Field of Classification Search
CPC ........... G03G 21/1821; G03G 21/1825; G03G 21/1828; G03G 21/1842; G03G 2221/163; G03G 2221/1861
See application file for complete search history.

(56) References Cited

U.S. PATENT DOCUMENTS

| | | | |
|---|---|---|---|
| 7,509,071 | B2 | 3/2009 | Yoshimura |
| 7,899,364 | B2 | 3/2011 | Chadani |
| 8,126,357 | B2 | 2/2012 | Satomura |
| 8,886,083 | B2 | 11/2014 | Igarashi |
| 9,031,458 | B2 | 5/2015 | Itabashi et al. |
| 9,213,306 | B2 | 12/2015 | Morioka et al. |
| 9,377,751 | B2 | 6/2016 | Yokoi |
| 9,632,479 | B2 | 4/2017 | Maeshima |
| 9,977,366 | B2 | 5/2018 | Nishimura et al. |
| 10,281,873 | B2 | 5/2019 | Makiguchi et al. |
| 10,409,214 | B2 | 9/2019 | Lee |
| 11,188,021 | B2 | 11/2021 | Takeuchi |
| 2012/0177400 | A1 | 7/2012 | Jang et al. |
| 2012/0269545 | A1 | 10/2012 | Morita |
| 2016/0018784 | A1 | 1/2016 | Maeshima |
| 2016/0202634 | A1 | 7/2016 | Ukai et al. |
| 2016/0216637 | A1 | 7/2016 | Maeshima et al. |
| 2016/0252871 | A1* | 9/2016 | Sasaki ................ G03G 21/1814 399/111 |
| 2018/0348700 | A1 | 12/2018 | Hirayama et al. |

FOREIGN PATENT DOCUMENTS

| | | | |
|---|---|---|---|
| CN | 103698990 | A | 4/2014 |
| EP | 1695153 | A2 | 8/2006 |
| JP | S6083046 | A | 5/1985 |
| JP | S6194071 | A | 5/1986 |
| JP | 2001337511 | A | 12/2001 |
| JP | 2002174938 | A | 6/2002 |
| JP | 2004118051 | A | 4/2004 |
| JP | 2006276190 | A | 10/2006 |
| JP | 2009180956 | A | 8/2009 |
| JP | 2009288324 | A | 12/2009 |
| JP | 2010026299 | A | 2/2010 |
| JP | 2013114109 | A | 6/2013 |
| JP | 2013250389 | A | 12/2013 |
| JP | 2014119592 | A | 6/2014 |
| JP | 2015022257 | A | 2/2015 |
| JP | 2015169876 | A | 9/2015 |
| JP | 2016095472 | A | 5/2016 |
| JP | 2018097285 | A | 6/2018 |
| JP | 2018120077 | A | 8/2018 |
| JP | 2018142016 | A | 9/2018 |
| TW | 201305750 | A1 | 2/2013 |
| TW | 201807519 | A1 | 3/2018 |
| WO | 0002096 | A1 | 1/2000 |

OTHER PUBLICATIONS

Notice of Allowance issued in U.S. Appl. No. 17/021,228 mailed Apr. 20, 2021.
Office Action issued in U.S. Appl. No. 17/377,750 mailed Feb. 15, 2022.
Notice of Allowance issued in U.S. Appl. No. 17/377,750 mailed Jul. 26, 2022.
Notice of Allowance issued in U.S. Appl. No. 17/021,228 mailed Jul. 30, 2021.
Decision on Grant issued in Russian Application No. 2020130307 mailed Jul. 22, 2021. English translation provided.
Office Action issued in Taiwanese Application No. 109130053 mailed Aug. 5, 2022. English translation provided.
Office Action issued in U.S. Appl. No. 17/957,085 mailed Mar. 29, 2023.
Notice of Allowance issued in U.S. Appl. No. 17/957,085 mailed Jun. 14, 2023.
Notice of Allowance issued in U.S. Appl. No. 18/461,819 mailed Apr. 10, 2024.

* cited by examiner

CARTRIDGE INCLUDING PHOTOSENSITIVE DRUM AND DEVELOPING ROLLER THAT CAN BE EASILY SEPARATED

BACKGROUND OF THE INVENTION

Field of the Invention

The present invention relates to a cartridge and an image forming apparatus.

Description of the Related Art

When an image is formed on a recording medium in an image forming apparatus such as a printer or the like that use an electrophotographic image forming system (electrophotographic process), a photosensitive drum is first uniformly charged by a charging roller. The charged photosensitive drum is then selectively exposed by an exposing device, thereby forming an electrostatic latent image on the photosensitive drum. The electrostatic latent image formed on the photosensitive drum is developed as a toner image by a developing device, with toner being used. The toner image formed on the photosensitive drum is transferred onto a recording medium such as a recording paper sheet, plastic sheet, or the like. The toner image transferred onto the recording medium is then fixed onto the recording medium by being heated and subjected to pressure by a fixing unit. Thus, an image is formed on the recording medium. Residual toner remaining on the photosensitive drum after transfer of the toner image onto the recording medium is removed by a cleaning blade.

Such image forming apparatuses generally require maintenance of process means, such as the photosensitive drum, charging roller, developing device, and so forth. For easier maintenance of the process means, in recent years the photosensitive drum, charging roller, cleaning blade, and developing device are integrated into a cartridge. A cartridge having such process means is generally referred to as a process cartridge. The process cartridge is detachably mountable to an apparatus main body of the image forming apparatus. With the process cartridge being made replaceable, the process means can be replaced and maintenance of the process means can be performed.

As developing means employed in such a process cartridge, there is available contact development in which developing is performed in a state where a developing roller is in contact with a photosensitive drum. In this contact development, the developing roller is in a state of being urged against the photosensitive drum by urging means provided in the process cartridge, in order to maintain a predetermined contact pressure between the developing roller and the photosensitive drum during image formation. In this arrangement, permanent deformation of an elastic layer of the developing roller may occur in a case where the developing roller is in a state of being in contact with the photosensitive drum and left unused for long periods of time. There may be a case where this causes image-density non-uniformity of a developing roller cycle in images when developing.

As a configuration to solve this problem, there has been proposed a process cartridge having a mechanism that separates the photosensitive drum and the developing roller from each other when an image formation operation is not being performed (Japanese Patent Application Publication No. 2001-337511). There also has been proposed a process cartridge having a mechanism where a developing roller, which had been separated, comes into contact by mounting the process cartridge to the image forming apparatus main body (Japanese Patent Application Publication No. 2006-276190).

SUMMARY OF THE INVENTION

The present invention is a further advancement of the above conventional technology. It is an object of the present invention to provide a cartridge in which an image bearing member and developer bearing member can be easily separated.

In order to achieve the object described above, a cartridge configured detachably mountable to a main body of an image forming apparatus according to the present invention, the cartridge including:

a first unit including an image bearing member and a first portion, and configured to take a removal posture when the cartridge is to be removed from the main body;

a second unit including a developer bearing member and a second portion, and rotatably connected to the first unit, the second unit being configured to be movable relative to the first unit by rotating around a rotational axis between (i) a first position where the developer bearing member is in contact with the image bearing member and (ii) a second position where the developer bearing member is separated from the image bearing member and the second portion is in contact with the first portion, wherein, in a state where the cartridge is removed from the main body and the first unit takes the removal posture, the second unit is located at the second position by an own weight of the second unit, in a case where the second unit is located at the second position, movement of the second unit in a direction, in which the developer bearing member is separated from the image bearing member, is restricted by the second portion coming into contact with the first portion, and a distance between the rotational axis and the second portion in a direction orthogonal to the rotational axis is shorter than a distance between a rotation center of the developer bearing member and the rotational axis.

Further features of the present invention will become apparent from the following description of exemplary embodiments (with reference to the attached drawings).

DESCRIPTION OF THE EMBODIMENTS

Embodiments of the present invention will now be described with reference to the drawings. Dimensions, materials, shapes of the components and the relative positions thereof described in the embodiments may be appropriately changed depending on the configuration of an apparatus to which the present invention is applied, and on various conditions, and are not intended to limit the scope of the invention to the following embodiments.

First Embodiment

Overall Configuration of Image Forming Apparatus 100

Figure 2:
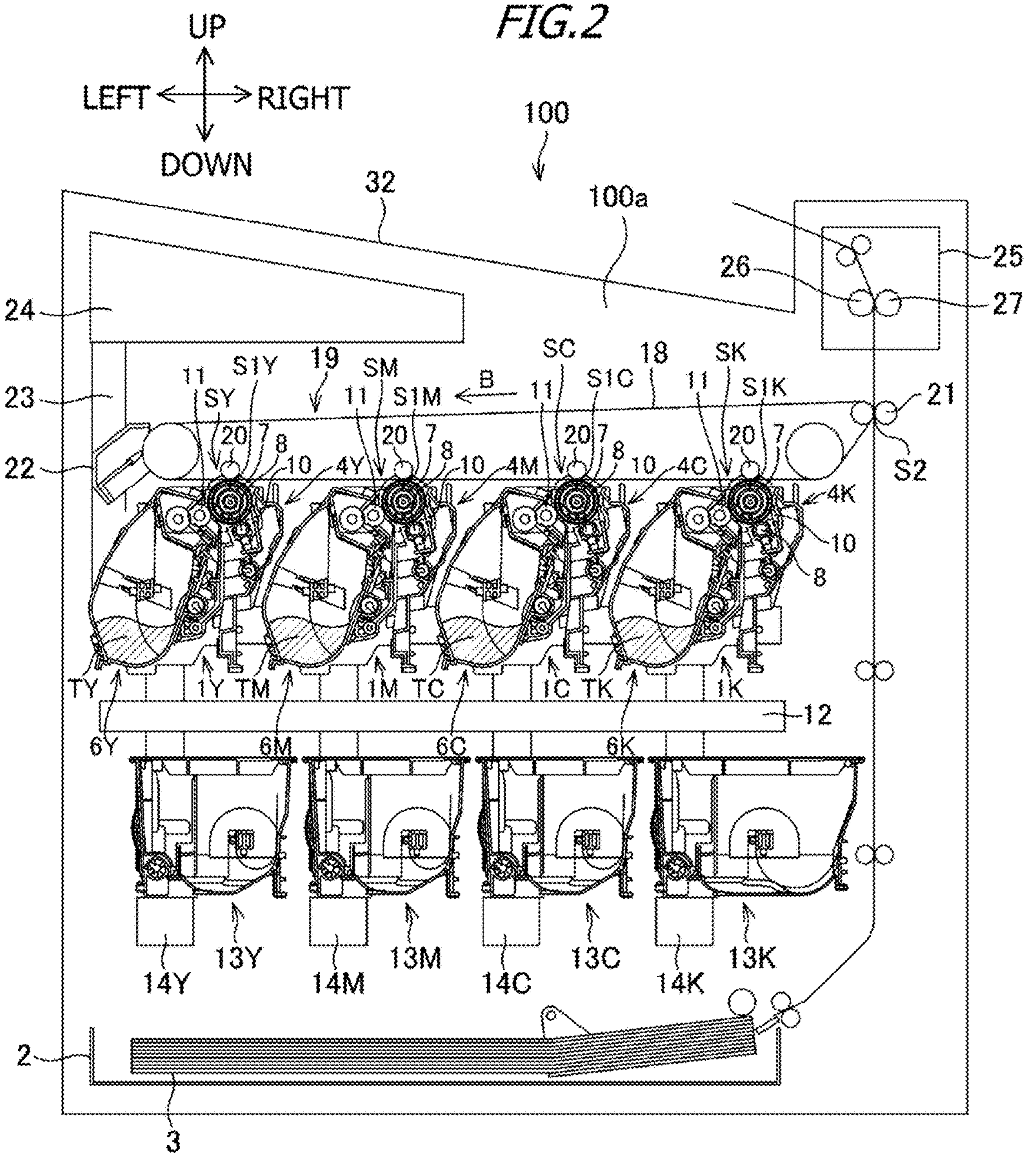
FIG. 2 is a schematic diagram of an electrophotographic image forming apparatus according to the embodiment.

An overall configuration of an electrophotographic image forming apparatus 100 (hereinafter, "image forming apparatus 100") according to the present embodiment will be described with reference to FIG. 2. FIG. 2 is a schematic diagram of the image forming apparatus 100 according to the present embodiment. In the present embodiment, a process cartridge 1 and a toner cartridge 13 are detachably mountable to an apparatus main body (main body) 100*a* of the image forming apparatus 100 that performs image formation. The image forming apparatus 100 has first, second, third, and fourth image forming units SY, SM, SC, and SK, that respectively form images of the colors yellow (Y), magenta (M), cyan (C), and black (K), as a plurality of image forming units. In the present embodiment, the configurations and operations of the first through fourth image forming units SY through SK are substantially the same, other than the color of the images formed being different. Accordingly, in the following description, the suffixes Y through K will be omitted and description will be made collectively, unless particular differentiation is necessary.

The first through fourth process cartridges 1 are disposed arrayed in the horizontal direction. Each process cartridge 1 is provided with a drum unit 4 that is a first unit, and a developing unit (developer container) 6 that is a second unit. The drum unit 4 has a photosensitive drum 7 serving as an image bearing member that bears developer images, a charging roller 8 serving as charging means that uniformly charges the surface of the photosensitive drum 7, and a cleaning blade 10 serving as cleaning means. The process cartridges 1 can each be removed from the apparatus main body 100*a* along the rotational axis direction of the photosensitive drum 7. The drum unit 4 is configured to take a removal posture when the process cartridge 1 is being removed from the apparatus main body 100*a*. The developing unit 6 accommodates a developing roller 11 and developer 60 (hereinafter, "toner"), and has developing means for developing electrostatic latent images on the photosensitive drum 7. The drum unit 4 and the developing unit 6 are supported pivotably as to each other. Note that the first process cartridge 1Y accommodates yellow (Y) toner within the developing unit 6. In the same way, the second process cartridge IM accommodates magenta (M) toner, the third process cartridge 1C cyan (C) toner, and the fourth process cartridge 1K black toner (K).

The process cartridge 1 is detachably mountable to the apparatus main body 100*a* in the rotational axis direction of the photosensitive drum 7, by mounting means such as a mounting guide (omitted from illustration), a positioning member (omitted from illustration), and so forth, provided to the image forming apparatus 100. The process cartridge 1 is detachably mountable to the apparatus main body 100*a* in a state where the drum unit 4 and the developing unit 6 are connected. That is to say, the drum unit 4 and the developing unit 6 can be integrally detached from and mounted to the apparatus main body 100*a*. Also, a scanner unit 12 for forming electrostatic latent images is positioned below the process cartridge 1. Further, a waste toner transport unit 23 is positioned to the back side of the process cartridge 1 (downstream side in the mounting/detaching direction of the process cartridge 1) of the image forming apparatus 100.

The first through fourth toner cartridges 13 are respectively disposed arrayed in the horizontal direction below the respective process cartridges 1, in the order corresponding to the color of toner accommodated in the respective process cartridges 1. That is to say, the first toner cartridge 13Y accommodates yellow (Y) toner. In the same way, the second toner cartridge 13M accommodates magenta (M) toner, the third toner cartridge 13C accommodates cyan (C) toner, and the fourth toner cartridge 13K accommodates black (K) toner. The toner cartridges 13 each supply toner to the process cartridges 1 that accommodate toner of the same color.

Supply operations of the toner cartridges 13 are performed when a remaining-amount detecting unit (omitted from illustration) provided to the apparatus main body 100*a* detects that the remaining amount of toner within a process cartridge 1 is insufficient. The toner cartridges 13 are detachably mountable to the image forming apparatus 100 by mounting means such as a mounting guide (omitted from illustration), a positioning member (omitted from illustration), and so forth, provided to the image forming apparatus 100. Note that the process cartridges 1 will be described in detail later.

First through fourth toner transport devices 14 are disposed below the toner cartridges 13, corresponding to the toner cartridges 13. The toner transport devices 14 transport toner received from the toner cartridge 13 upward in the vertical direction, and supply toner to the developing units 6. Thus, toner is supplied from the toner cartridges 13 that are supply containers into the developing units 6.

Above the process cartridges 1 in the vertical direction is provided an intermediate transfer unit 19 serving as an intermediate transfer member. The intermediate transfer unit 19 is disposed generally horizontally, with a primary transfer portion S1 side facing downwards in the vertical direction. An intermediate transfer belt 18 that faces each photosensitive drum 7 is an endless belt capable of being rotated, and is stretched around a plurality of tension rollers. Disposed on the inner face of the intermediate transfer belt 18 are primary transfer rollers 20 that are primary transfer members, at positions forming primary transfer portions S1 with the photosensitive drums 7 across the intermediate transfer belt 18. A secondary transfer roller 21 that is a secondary transfer member also comes into contact with the intermediate transfer belt 18, and together with a roller on the reverse face of the intermediate transfer belt 18 make up a secondary transfer portion S2. An intermediate transfer belt cleaning unit 22 is further disposed on the opposite side from the secondary transfer portion S2 in the lateral direction (the direction in which the intermediate transfer belt 18 is stretched).

A fixing unit 25 is disposed above the intermediate transfer unit 19 in the vertical direction. The fixing unit 25 has a heating unit 26 and a pressure-applying roller 27 that applies pressure to the heating unit 26. A discharge tray 32 is provided on the upper face of the apparatus main body 100*a*, and a waste toner recovery container 24 is provided between the discharge tray 32 and the intermediate transfer unit 19. Further, a sheet feed tray 2 that accommodates a recording medium 3 is provided at the lowest portion of the apparatus main body 100*a*.

Image Forming Process

Figure 3:
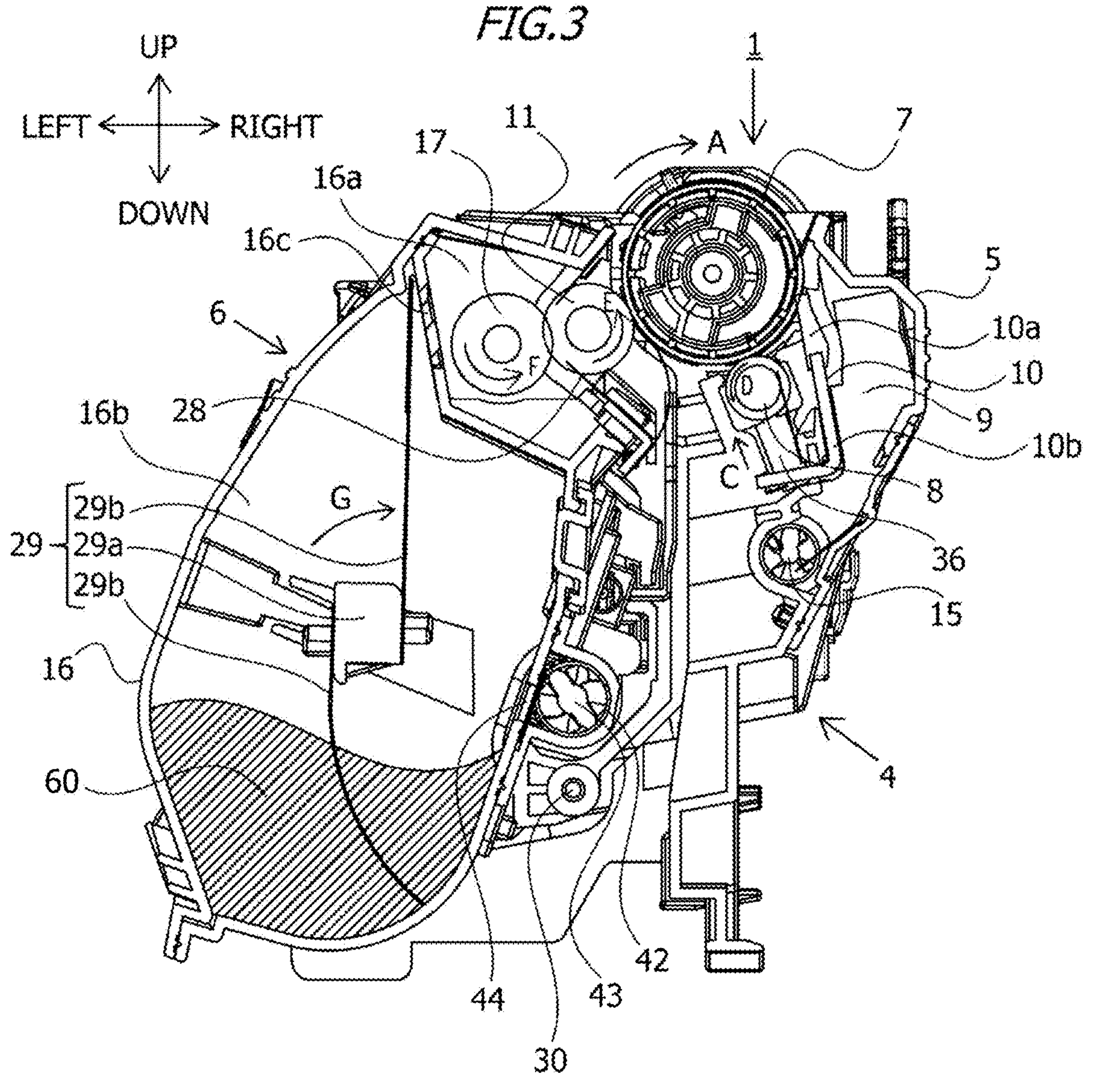
FIG. 3 is a cross-sectional view of the process cartridge according to the embodiment.

Image forming operations by the image forming apparatus 100 will be described next with reference to FIGS. 2 and 3. FIG. 3 is a cross-sectional view of the process cartridge 1 according to the present embodiment. When performing image formation, the photosensitive drum 7 is rotationally driven in the direction of arrow A in FIG. 3, at a predetermined speed. The intermediate transfer belt 18 is rotationally driven in the direction of arrow B (forward direction as to rotation of the photosensitive drum 7).

First, the surface of the photosensitive drum 7 is uniformly charged by the charging roller 8. Next scanning exposure of the surface of the photosensitive drum 7 is performed by a laser beam emitted by the scanner unit 12, thereby forming an electrostatic latent image based on image information (image data) on the photosensitive drum 7. The electrostatic latent image formed on the photosensitive drum 7 is developed by the developing unit 6 as a toner image (developer image). At this time, pressure is being applied to the developing unit 6 by a developing pressure-applying unit (omitted from illustration) provided to the apparatus main body 100*a*. Primary transfer of the toner image formed on the photosensitive drum 7 onto the intermediate transfer belt 18 is then performed by the primary transfer rollers 20.

For example, when performing full-color image forming, the process described above is sequentially performed at the first through fourth image forming units SY through SK, thereby sequentially overlaying the toner images of the respective colors on the intermediate transfer belt 18. Meanwhile, the recording medium 3 accommodated in the sheet feed tray 2 is fed at a predetermined control timing, and is transported to the secondary transfer portion S2 synchronously with the movement of the intermediate transfer belt 18. Secondary transfer is then performed of the four-color toner image on the intermediate transfer belt 18 as one onto the recording medium 3, by the secondary transfer roller 21 in contact with the intermediate transfer belt 18 across the recording medium 3.

Thereafter, the recording medium 3 onto which the toner image has been transferred is transported to the fixing unit 25. Subjecting the recording medium 3 to heat and pressure at the fixing unit 25 fixes the toner image onto the recording medium 3. Subsequently, the recording medium 3 onto which the toner image has been fixed is transported to the discharge tray 32, thereby completing the image forming operations.

Also, primary transfer-residual toner (waste toner) remaining on the photosensitive drum 7 after the primary transfer process is removed by the cleaning blade 10. Secondary transfer-residual toner (waste toner) remaining on the intermediate transfer belt 18 after the secondary transfer process is removed by the intermediate transfer belt cleaning unit 22. The waste toner removed by the cleaning blade 10 and the intermediate transfer belt cleaning unit 22 is transported by the waste toner transport unit 23 provided to the apparatus main body 100*a*, and is accumulated in the waste toner recovery container 24. Note that the image forming apparatus 100 may also form a monochrome or multi-color images using only a desired one or several (but not all) image forming units.

Process Cartridge

Figure 4A:
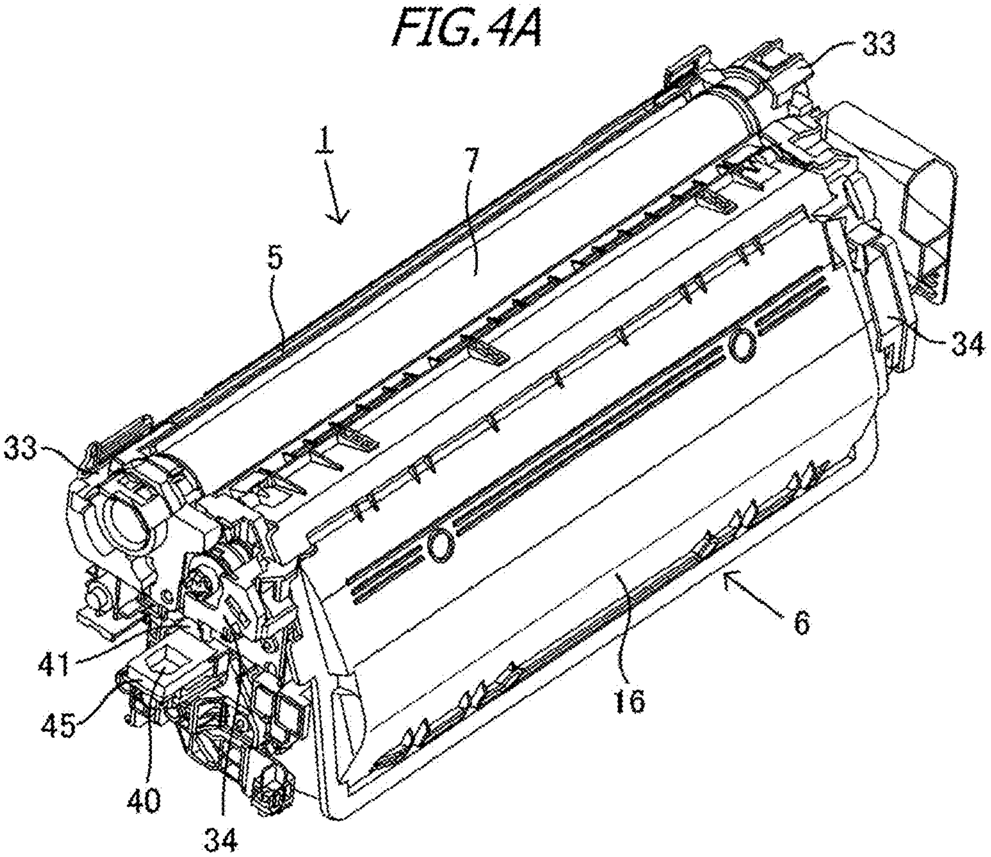
FIGS. 4A and 4B are full perspective views of a back side and rear side of the process cartridge according to the embodiment.
Figure 4B:
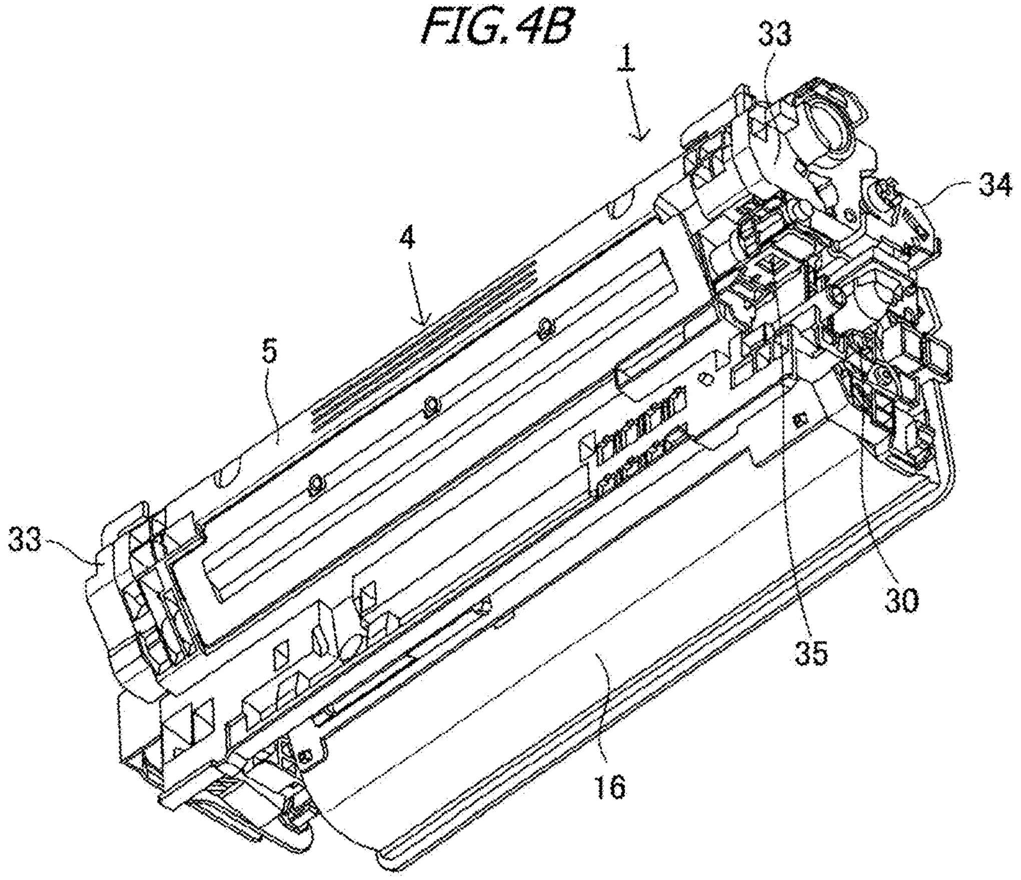

Next, the overall configuration of the process cartridge 1 mounted to the image forming apparatus 100 according to the present embodiment will be described with reference to FIGS. 3, 4A, and 4B. FIG. 3 is a cross-sectional view of the process cartridge 1 according to the present embodiment. FIG. 4A is a perspective view of the process cartridge 1 as viewed from the back side (the downstream side in the mounting/detaching direction of the process cartridge 1). FIG. 4B is a perspective view of the process cartridge 1 as viewed from the rear side.

The process cartridge 1 has the drum unit 4 and the developing unit 6. The process cartridge 1 has one drum unit (photosensitive unit) 4 and one developing unit 6. That is to say, the process cartridge 1 has one photosensitive drum 7 and one developing roller 11. The drum unit 4 and the developing unit 6 are pivotably (movably) connected, centered on rotation supporting pins 30. Accordingly, the developing unit 6 is connected to the drum unit 4 so as to be rotatable around the rotational axis of the developing unit 6. The developing unit 6 is inseparably connected to the drum unit 4. The developing unit 6 is restricted from moving as to the drum unit 4 in the direction of the rotational axis of the developing unit 6 in a state where the process cartridge 1 is removed from the apparatus main body 100*a*. Further, the developing unit 6 is allowed to rotated as to the drum unit 4 around the rotational axis of the developing unit 6, but is restricted from moving in parallel in a direction intersecting the rotational axis of the developing unit 6. The drum unit 4 has a drum frame 5 that supports various members within the drum unit 4. The drum unit 4 has the photosensitive drum 7, the charging roller 8, the cleaning blade 10, and a waste toner screw 15 that extends in a direction parallel to the rotational axis direction of the photosensitive drum 7. A drum bearing 33 supports the photosensitive drum 7 such that the photosensitive drum 7 is rotatable. The drum bearing 33 is provided at both ends of the drum unit 4 in the longitudinal direction. The drum bearing 33 has a gear train for transmitting driving force from the photosensitive drum 7 to the waste toner screw 15. In other words, a pair of drum bearings 33 is provided at both ends of the drum frame 5 in the longitudinal direction, whereby the drum frame 5 supports the photosensitive drum 7 such that the photosensitive drum 7 is rotatable.

The charging roller 8 provided to the drum unit 4 is urged toward the photosensitive drum 7 in the direction of arrow C, by a charging roller pressure-applying spring 36. The charging roller 8 is provided so as to be driven by the photosensitive drum 7, and rotates in the direction of arrow D (forward direction as to rotation of the photosensitive drum 7) upon the photosensitive drum 7 being rotationally driven in the direction of arrow A when forming images.

The cleaning blade 10 provided to the drum unit 4 is configured of an elastic member 10*a* for removing transfer-residual toner (waste toner) remaining on the surface of the photosensitive drum 7 after primary transfer, and a supporting member 10*b* for supporting the elastic member 10*a*. The waste toner removed from the surface of the photosensitive drum 7 by the cleaning blade 10 is accommodated in a waste toner accommodation chamber 9 made up of the cleaning blade 10 and the drum frame 5. The waste toner accommodated in the waste toner accommodation chamber 9 is transported toward the back side of the image forming apparatus 100 (the downstream side in the direction of mounting/detaching the process cartridge 1) by the waste toner screw 15 disposed within the waste toner accommodation chamber 9. The transported waste toner is discharged from a waste toner discharge portion 35, and is handed over to the waste toner transport unit 23 of the image forming apparatus 100.

The developing unit 6 that is a developer container has a developing frame 16 that supports various members within the developing unit 6. The developing frame 16 is divided into a developing chamber 16*a* in which the developing roller (developer bearing member) 11 and a supply roller 17 are provided, and a toner accommodation chamber (developer accommodation chamber) 16*b* in which toner is accommodated and a stirring member 29 is disposed. The developing roller 11 and the supply roller 17 are provided to the developing frame 16, and the developing unit 6 is also referred to as a developing device.

The developing roller 11, the supply roller 17, and a developing blade 28 are provided to the developing chamber 16*a*. The developing roller 11 bears toner, and transports toner to the photosensitive drum 7 by rotating in the direction of arrow E in contact with the photosensitive drum 7 when forming images. The developing roller 11 also is rotatably supported by bearing portions (omitted from illustration) provided to developing bearings 34 at both ends thereof in the longitudinal direction (rotational axis direction). Thus, the developing bearings 34 that are bearing members support the developing roller 11 such that the developing roller 11 is rotatable. The supply roller 17 is in contact with the developing roller 11 and is rotatably supported by bearing portions (omitted from illustration) provided to the developing bearings 34. The supply roller 17 rotates in the direction of arrow F when forming images. The developing blade 28 that is a layer thickness control member is disposed so as to be in contact with the surface of the developing roller 11. The developing blade 28 controls the thickness of the toner layer formed on the developing roller 11.

The toner accommodation chamber 16*b* is provided with the stirring member (transporting member) 29 that stirs the toner 60 accommodated in the toner accommodation chamber 16*b*, and also transports toner within the toner accommodation chamber 16*b* to the developing chamber 16*a* via a developing communication hole 16*c*. The stirring member 29 has a rotation shaft 29*a* that is parallel to the rotational axis direction of the developing roller 11, and stirring sheets 29*b*. The stirring sheets 29*b* are sheets that have flexibility. One end of the stirring sheets 29*b* is attached to the rotation shaft 29*a*, and the other end of the stirring sheets 29*b* is a free end. Toner is stirred by the stirring sheets 29*b* by the rotation shaft 29*a* rotating and the stirring sheets 29*b* rotating in the direction of arrow G.

The developing unit 6 has the developing communication hole 16*c* communicating between the developing chamber 16*a* and the toner accommodation chamber 16*b*. In the present embodiment, when the developing unit 6 is in a normal usage posture (posture when being used), the developing chamber 16*a* is positioned above the toner accommodation chamber 16*b* in the vertical direction. The toner within the toner accommodation chamber 16*b* that is drawn up by the stirring member 29 passes through the developing communication hole 16*c* and is supplied to the developing chamber 16*a*.

Further, a toner inlet 40 is provided to the developing unit 6. The toner inlet 40 is provided at one end side of the developing unit 6 with regard to the rotational axis direction of the developing roller 11. In the present embodiment, the toner inlet 40 is provided at the downstream side of the developing unit 6 in the mounting/detaching direction of the process cartridge 1. An inlet seal member 45, and an inlet shutter 41 capable of moving in the front and back direction, are disposed at the top of the toner inlet 40. When the process cartridge 1 is not mounted to the image forming apparatus 100, the toner inlet 40 is closed by the inlet shutter 41. The inlet shutter 41 is configured to be urged by the image forming apparatus 100 and open in conjunction with mounting/detaching operations of the process cartridge 1.

An intake transport path 42 is provided to the developing unit 6, and a transporting screw (rotary member) 43 that is rotatable is disposed inside the intake transport path 42. The intake transport path 42 has the toner inlet (inlet) 40 for intake of toner, and the toner inlet 40 and the intake transport path 42 communicate. Further, an accommodation chamber communication opening 44 for supplying toner to the toner accommodation chamber 16*b* is provided around the middle of the developing unit 6 in the longitudinal direction, with the intake transport path 42 and the toner accommodation chamber 16*b* communicating through the accommodation chamber communication opening 44. The intake transport path 42 is a guide portion to guide toner to the accommodation chamber communication opening 44. The transporting screw 43 extends in parallel to the rotational axis direction of the developing roller 11 and the supply roller 17. A transporting fin portion (transporting portion) is provided on the transporting screw 43. When the transporting screw 43 rotates, toner taken in through the toner inlet 40 is transmitted through the intake transport path 42 by the transporting fin portion to the accommodation chamber communication opening 44. The toner is then supplied into the toner accommodation chamber 16*b* through the accommodation chamber communication opening 44 communicating with the toner accommodation chamber 16*b*.

Contact and Separation Operations

Figure 1A:
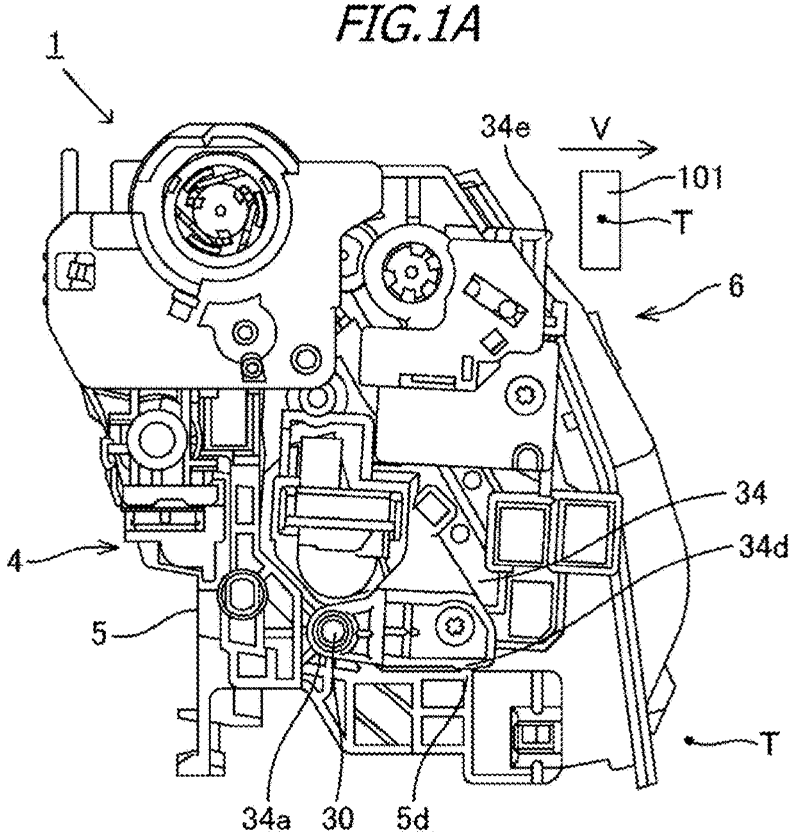
FIGS. 1A and 1B are side views of a process cartridge according to an embodiment.
Figure 1B:
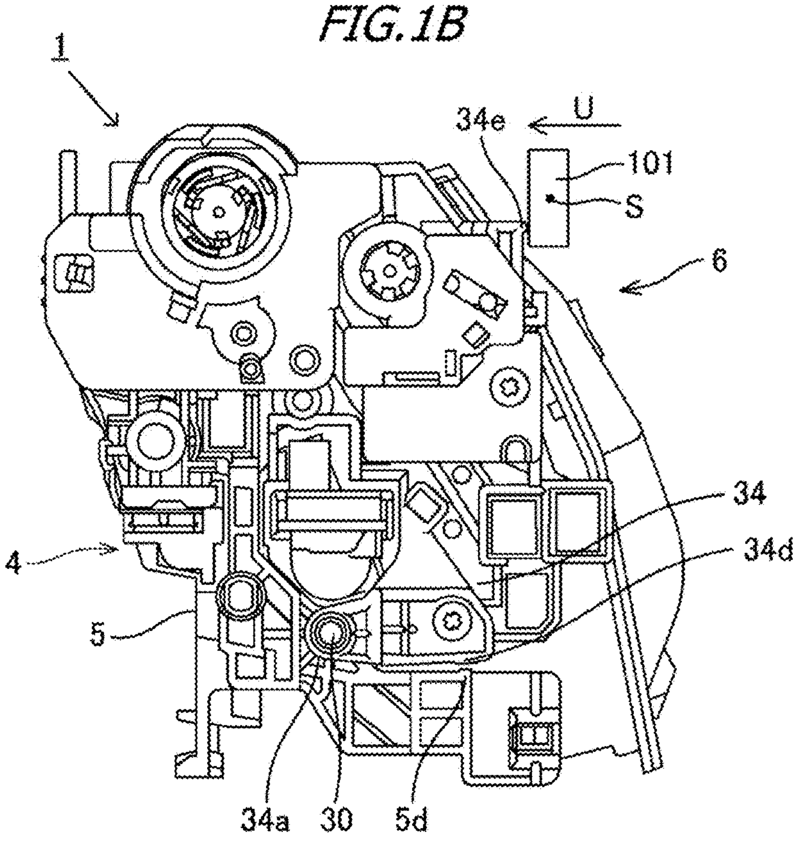
Figure 5:
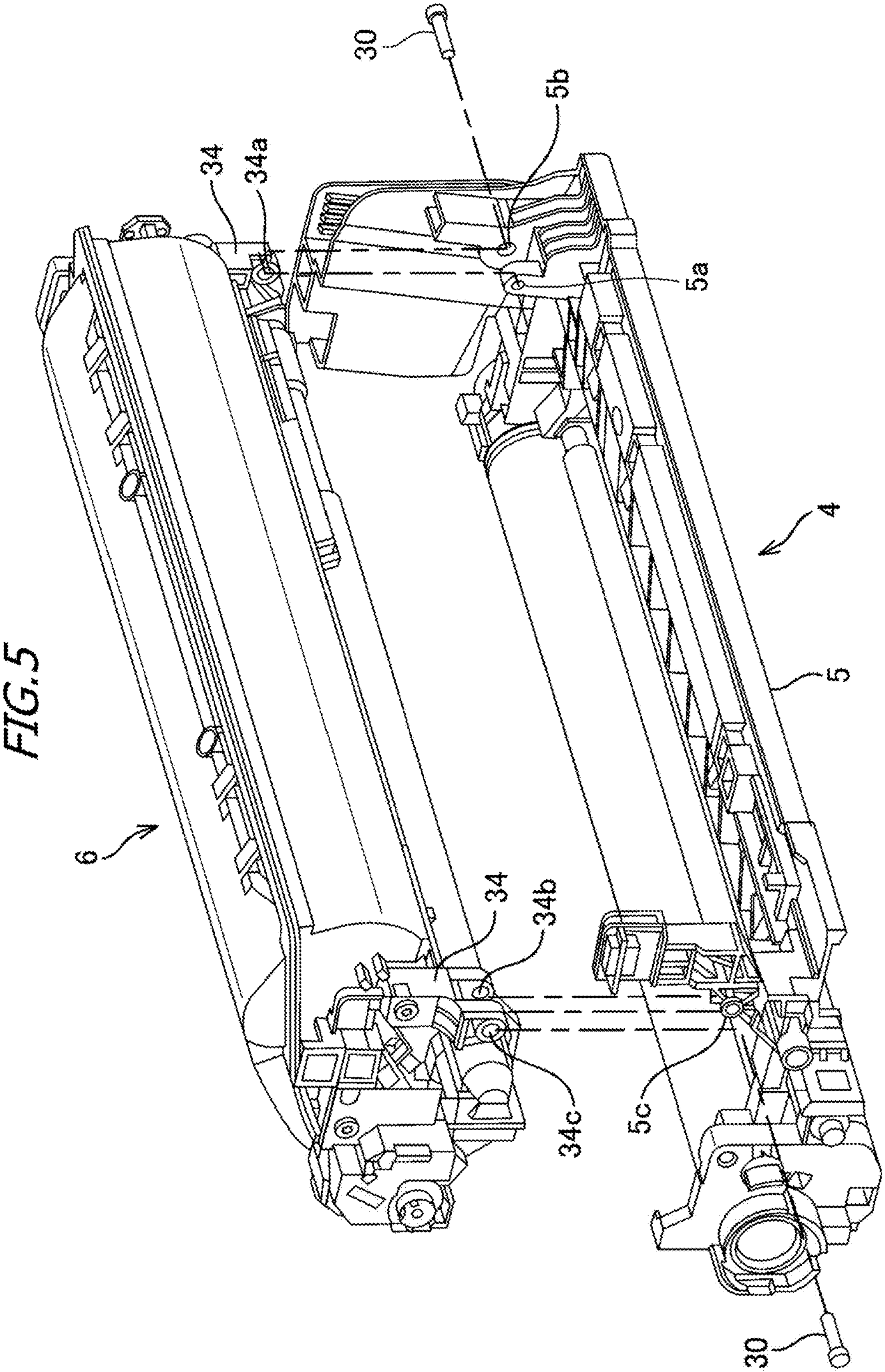
FIG. 5 is a schematic diagram illustrating a connected state of a developing unit and a drum unit.
Figure 6A:
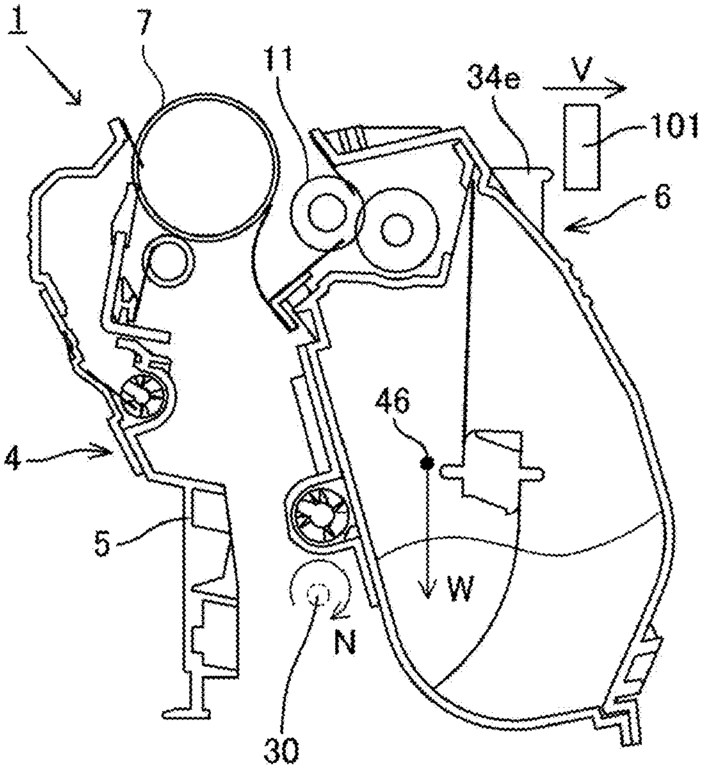
FIGS. 6A and 6B are cross-sectional views illustrating a separated state and a contact state of a developing roller and photosensitive drum.
Figure 6B:
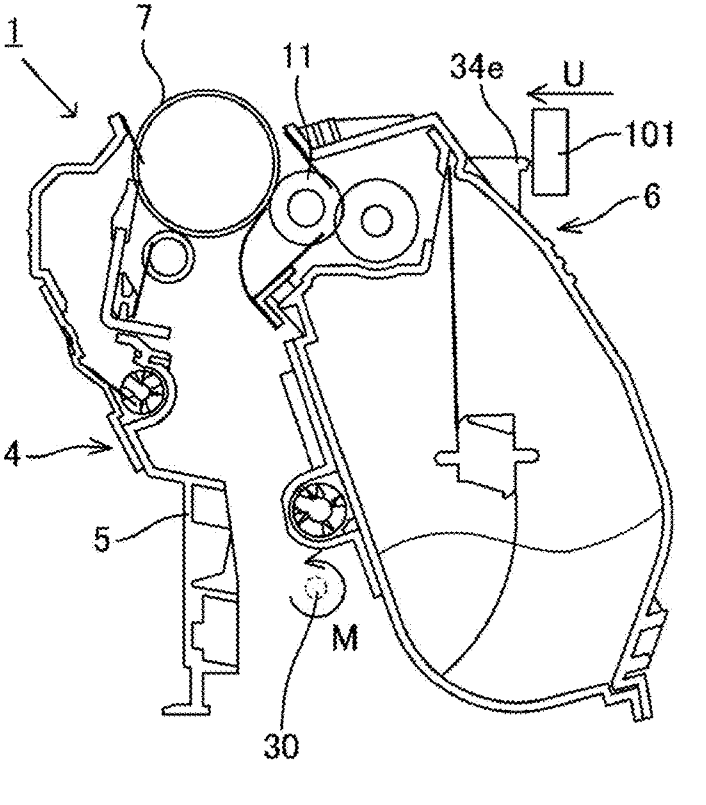

Next, contact/separation operations of the developing roller 11 and the photosensitive drum 7 will be described in detail with reference to FIGS. 1A, 1B, 5, 6A, and 6B. FIG. 1A is a side view of the process cartridge 1 in a state where the developing roller 11 and the photosensitive drum 7 are separated, and FIG. 1B is a side view of the process cartridge 1 in a state where the developing roller 11 and the photosensitive drum 7 are in contact. FIG. 5 is a schematic perspective view illustrating a state where the drum unit 4 and the developing unit 6 are connected. FIG. 6A is a cross-sectional view illustrating a state where the developing roller 11 and the photosensitive drum 7 are separated, and FIG. 6B is a cross-sectional view illustrating a state where the developing roller 11 and the photosensitive drum 7 are in contact. FIGS. 6A and 6B are cross-sectional views taken around the middle of the process cartridge 1.

A pair of holes 5*a* and 5*b* are provided at one end of the drum frame 5 in the longitudinal direction, and a hole 5*c* is provided at the other end of the drum frame 5 in the longitudinal direction, as illustrated in FIG. 5. Meanwhile, a pivoting hole (supporting hole) 34*a* corresponding to the pair of holes 5*a* and 5*b* of the drum frame 5 is provided to one of the two developing bearings 34, and a pair of pivoting holes (supporting holes) 34*b* and 34*c* corresponding to the hole 5*c* is provided to the other of the two developing bearings 34. One of the two rotation supporting pins 30 is fit into the pivoting hole 34*a* and the holes 5*a* and 5*b*, and the other of the two rotation supporting pins 30 is fit into the pivoting holes 34*b* and 34*c* and the hole 5*c*. Thus, the developing unit 6 is connected to the drum unit 4 so as to be capable of pivoting to the drum unit 4 centered on the rotation supporting pins 30 or the pivoting holes 34*a* through 34*c*. Accordingly, the developing unit 6 is supported by the drum unit 4. That is to say, the center axis of the rotation supporting pins 30 matches the rotational axis of the developing unit 6 rotating to the drum unit 4.

Also, a restricting portion 5*d* (first portion) is provided on one end of the drum frame 5 in the longitudinal direction, and a bearing restricting portion 34*d* (second portion) is provided on the developing bearing 34 at a position corresponding to the restricting portion 5*d*, as illustrated in FIGS. 1A and 1B. The restricting portion 5*d* and the bearing restricting portion 34*d* are disposed at positions away from the rotational axis of the developing unit 6 (center axis of rotation supporting pins 30) in a direction orthogonal to the rotational axis of the developing unit 6. In a state of the restricting portion 5*d* and the bearing restricting portion 34*d* facing each other, the restricting portion 5*d* has a protruded form, and the bearing restricting portion 34*d* has a planar form. Accordingly, a protruded portion is provided to the restricting portion 5*d* on a face that faces the bearing restricting portion 34*d*. This configuration is not limiting, and the restricting portion 5*d* and the bearing restricting portion 34*d* may both have protruded forms. Also, the restricting portion 5*d* may have a planar form and the bearing restricting portion 34*d* may have a protruded form. It can be understood from FIGS. 1A, 1B, 6A, and 6B, that the distance between the rotational axis of the developing unit 6 and the restricting portion 5*d* is shorter than the distance between the rotational axis of the developing unit 6 (center axis of the rotation supporting pins 30) and the rotational center of the developing roller 11, with regard to the direction orthogonal to the rotational axis of the developing unit 6. In the same way, the distance between the rotational axis of the developing unit 6 and the bearing restricting portion 34*d* is shorter than the distance between the rotational axis of the developing unit 6 and the rotational center of the developing roller 11. Accordingly, the restricting portion 5*d* and the bearing restricting portion 34*d* can be provided using little space.

Although the restricting portion 5*d* is provided on one end of the drum frame 5 in the longitudinal direction, and the bearing restricting portion 34*d* is provided on one of the two developing bearings 34 in the present embodiment, this configuration is not limiting. For example, an arrangement may be made where the restricting portion 5*d* is provided at the middle of the drum frame 5 in the longitudinal direction, and the bearing restricting portion 34*d* is provided at the middle of the developing frame 16 in the longitudinal direction. Also, for example, an arrangement may be made where one of two restricting portions 5*d* is provided at one end of the drum frame 5 in the longitudinal direction, and the other of the two restricting portions 5*d* is provided at the other end of the drum frame 5 in the longitudinal direction. Further, for example, an arrangement may be made where one of two bearing restricting portions 34*d* is provided to one of the two developing bearings 34, and the other of the two bearing restricting portions 34*d* is provided to the other of the two developing bearings 34.

When not forming images, the weight (own weight) of the developing unit 6 as to a center of gravity 46 of the developing unit 6 (direction of arrow W in FIG. 6A) generates moment (direction of arrow N in FIG. 6A) around the rotation supporting pins 30, and the developing roller 11 and the photosensitive drum 7 separate from each other. A separated state where the developing roller 11 and the photosensitive drum 7 are separated from each other is then maintained by the restricting portion 5*d* and the bearing restricting portion 34*d* being in contact, as illustrated in FIG. 1A. Hereinafter, the position of the developing unit 6 in the separated state where the developing roller 11 and the photosensitive drum 7 are separated will be referred to as “separated position”. Moving the position of the developing unit 6 to the separated position when not forming images enables deformation of the surface layer of the developing roller 11 due to contact between the developing roller 11 and the photosensitive drum 7 to be suppressed.

Pressure-applying levers 101 are provided at both ends of the apparatus main body 100*a* in the longitudinal direction. The pressure-applying levers 101 are movable between a pressure-applying position (position S in FIG. 1B), and a non-pressure-applying position (position T in FIG. 1A) by a mechanism omitted from illustration. Also, pressure-receiving portions 34*e* are provided at each of the positions corresponding to the two pressure-applying levers 101.

When forming images, the pressure-applying levers 101 move in a pressure-applying direction (direction of arrow U), and come into contact with the pressure-receiving portions 34*e* of the developing bearings 34, as illustrated in FIG. 1B. Accordingly, the pressure-applying levers 101 urges the developing bearings 34, whereby the developing unit 6 rotates in the direction of arrow M in FIG. 6B, centered on the rotation supporting pins 30, and the developing roller 11 and the photosensitive drum 7 come into contact. Hereinafter, the position of the developing unit 6 (developing roller 11) in the contact state where the developing roller 11 and the photosensitive drum 7 are in contact will be referred to as “contact position”. When image forming ends, the pressure-applying levers 101 move in a retracting direction (direction of arrow V in FIGS. 1A and 6A). The moment (direction of arrow N in FIG. 6A) around the rotation supporting pins 30 due to the own weight of the developing unit 6 (direction of arrow W in FIG. 6A) causes the developing unit 6 to move to the separated position again. When the developing unit 6 is at the separated position and the contact position, the pressure-receiving portions 34*e* are positioned above the rotational axis of the developing unit 6 in the vertical direction. The operations of the pressure-applying levers 101 are controlled by a control unit provided to the apparatus main body 100*a*. Contact operations and separation operations of the developing roller 11 due to the movement of the pressure-applying levers 101 preferably are performed in a state where the photosensitive drum 7 is rotating, and more preferably are performed in a state where the photosensitive drum 7 and the developing roller 11 are rotating.

Now, the position of center of gravity and the weight of the developing unit 6 change depending on the amount of toner accommodated in the developing unit 6. Accordingly, the positions of the rotation supporting pin 30 are designed such that the developing unit 6 moves to the separated position due to moment generated by the own weight of the developing unit 6, regardless of the amount of toner remaining within the developing unit 6.

Now, the drum unit 4 is taking a posture taken when image forming operations are performed in FIG. 6B, and the developing unit 6 is positioned at the contact position. Conversely, in FIG. 6A, the posture of the drum unit 4 is the same as in FIG. 6B, and the developing unit 6 is positioned at the separated position. The posture of the drum unit 4 when removing the process cartridge 1 from the apparatus main body 100*a* (removal posture) and the posture of the drum unit 4 when performing image forming operations are the same posture, which will be described later. Accordingly, the posture of the drum unit 4 when removing the process cartridge 1 from the apparatus main body 100*a* is the same as the position illustrated in FIGS. 6A and 6B. As illustrated in FIG. 6A, the photosensitive drum 7 and the developing roller 11 are positioned above the rotational axis of the developing unit 6 (the center axis of the rotation supporting pins 30) in the vertical direction. As illustrated in FIG. 6A, the rotational axis of the developing unit 6 (the center axis of the rotation supporting pins 30) is positioned so that the center of gravity 46 of the developing unit 6 is located above the rotational axis of the developing unit 6 in the vertical direction in the present embodiment. The rotational axis of the developing unit 6 is also positioned so that the center of gravity 46 of the developing unit 6 is located on the opposite side from the photosensitive drum 7 in the horizontal direction. Also, the region of the developing unit 6 located above the rotational axis of the developing unit 6 in the vertical direction is larger than the region of the developing unit 6 located below the rotational axis of the developing unit 6, as illustrated in FIG. 6A. Further, in the present embodiment, the weight of the region of the developing unit 6 located above the rotational axis of the developing unit 6 in the vertical direction is heavier than the weight of the region of the developing unit 6 located below the rotational axis of the developing unit 6. This arrangement enables stable separating of the developing unit 6 to be performed by the own weight thereof.

Removing Process Cartridge from Apparatus Main Unit

The process cartridge 1 can be removed by opening a door of the apparatus main body 100*a*. For example, the process cartridge 1 can be removed from the apparatus main body 100*a* by holding a handle provided on the near side of the process cartridge 1 and pulling the process cartridge 1 out in the axial direction of the photosensitive drum 7.

In the present embodiment, opening the door of the apparatus main body 100*a* causes the photosensitive drum 7 to move to a position away from the intermediate transfer belt 18 while the drum unit 4 maintains the same posture as when forming images in the process cartridge 1. In this state, the process cartridge 1 is allowed to be mounted to or detached (removed) from the apparatus main body 100*a*. That is to say, the posture of the drum unit 4 when the process cartridge 1 is to be removed from the apparatus main body 100*a* (removal posture) and the posture of the drum unit 4 when image forming operations are being performed are the same posture. In a state in which the process cartridge 1 is mounted to the apparatus main body 100*a* and the drum unit 4 takes the removal posture, removing the process cartridge 1 from the apparatus main body 100*a* is allowed. Accordingly, in the following description regarding removal of the process cartridge 1 with reference to FIGS. 1A, 1B, 6A, and 6B, description will be made presuming that the drum unit 4 illustrated in FIGS. 1A, 1B, 6A, and 6B is taking the removal posture. Also note that the up-down direction in FIGS. 1A, 1B, 6A, and 6B is the same vertical direction as when the drum unit 4 is taking the removal posture. Moreover, the right-left direction in FIGS. 1A, 1B, 6A, and 6B is the same horizontal direction as when the drum unit 4 is taking the removal posture. The position relation between the rotational axis of the developing unit 6 and the center of gravity 46 of the developing unit 6 and so forth at this time is the same as in the description made with reference to FIG. 6A described above.

When the pressure-applying levers 101 move in the retracting direction (direction of arrow V in FIGS. 1A and 6A), the weight of the developing unit 6 generates moment in the developing unit 6 around the rotation supporting pins 30. Also, in the same way, in a state where the process cartridge 1 is removed from the apparatus main body 100*a*, the weight of the developing unit 6 generates moment in the developing unit 6 around the rotation supporting pins 30. Accordingly, the developing unit 6 moves to the separated position so that the developing roller 11 and the photosensitive drum 7 are separated, and the restricting portion 5*d* and the bearing restricting portion 34*d* come into contact, as illustrated in FIG. 1A. Accordingly, even in a case where the process cartridge 1 is left standing for a long period of time, permanent deformation of the elastic layer of the developing roller 11 due to contact between the developing roller 11 and the photosensitive drum 7 can be suppressed.

That is to say, the process cartridge 1 is configured so that, when the drum unit 4 takes the removal posture, the developing unit 6 automatically moves from the contact position to the separated position by the own weight of the developing unit 6. Note that it is not necessary for the developing unit 6 to move from the contact position to the separated position by the own weight thereof alone. For example, the process cartridge 1 may have a urging member that urges the developing unit 6 in the direction of moving from the developing unit 6 from the contact position to the separated position.

In the process cartridge 1, when the drum unit 4 takes the removal posture, the developing unit 6 naturally is separated from the contact position to the separated position by the own weight of the developing unit 6. That is to say, when the process cartridge 1 is removed from the apparatus main body 100*a* and the drum unit 4 takes the same posture as the removal posture, the developing unit 6 is located at the separated position. In other words, in a state where the process cartridge 1 is removed from the apparatus main body 100*a* and the drum unit 4 takes the removal posture, the developing unit 6 is located at the separated position by the own weight of the developing unit 6. Also, the posture of the drum unit 4 when removal of the process cartridge 1 from the apparatus main body 100*a* is allowed is included in the posture of the drum unit 4 when the developing unit 6 is located at the separated position by the own weight thereof. Accordingly, when removing the process cartridge 1 from the apparatus main body 100*a*, the developing unit 6 naturally moves to the separated position, and further the developing unit 6 remains at the separated position after the process cartridge 1 is removed from the apparatus main body 100*a* as well. Thus, the developing unit 6 can be made to be positioned at the separated position when the process cartridge 1 is removed from the apparatus main body 100*a* without performing any special operations. Also, there is no need to provide a separation member to maintain the developing unit 6 at the separated position. That is to say, the developing roller 11 can be easily separated from the photosensitive drum 7 in a state where the process cartridge 1 is removed from the apparatus main body 100*a*.

In the present embodiment, even if the drum unit 4 is rotated from the posture illustrated in FIG. 6A in a first direction and a second direction that is opposite to the first direction (clockwise and counterclockwise) centered on the rotational axis of the developing unit 6, the developing unit 6 is maintained at the separated position within a predetermined range. That is to say, the center of gravity 46 of the developing unit 6 keeps the developing unit 6 in a position urged toward the separated position. In the present embodiment, the developing unit 6 is at the separated position in both a case of rotating the drum unit 4 30° clockwise around the rotational axis of the developing unit 6 from the state illustrated in FIG. 6A, and a case of rotating the drum unit 4 30° counterclockwise therefrom. In order to maintain the developing unit 6 at the separated position in a stable manner even when the process cartridge 1 is removed from the apparatus main body 100*a*, the developing unit 6 is preferably maintained at the separated position even if the drum unit 4 rotates 10° in both directions. More preferably, the developing unit 6 is preferably maintained at the separated position even if the drum unit 4 rotates 30° in both directions around the rotational axis of the developing unit 6, as described above.

The positions of the restricting portion 5*d* and the bearing restricting portion 34*d* are each set such that even in a state where there is variance in parts dimensions and so forth, the developing roller 11 and the photosensitive drum 7 can be separated in a sure manner when the developing unit 6 moves to the separated position. Now, the developing bearings 34 are provided with bearing portions (omitted from illustration) for the developing roller 11, the pivoting hole 34*b*, and the bearing restricting portion 34*d*. Providing the bearing portions for the developing roller 11, the pivoting hole 34*b*, and the bearing restricting portion 34*d* to the same part can reduce variance in the separated position due to change in parts dimensions, as compared to a case where the bearing portions for the developing roller 11, the pivoting hole 34*b*, and the bearing restricting portion 34*d* are provided to a plurality of parts. Accordingly, the amount of necessary movement of the developing unit 6 as to the drum unit 4 in order to separate the developing roller 11 and the photosensitive drum 7 in a sure manner can be set to be small. Thus, the distance between the contact position and the separated position can be made to be smaller, thereby improving user operability. It can also be understood from FIGS. 1A, 1B, and 5 that in the present embodiment, the position of the rotation supporting pin 30 and the positions of the bearing restricting portion 34*d* and restricting portion 5*d* overlap with respect to the rotational axis direction of the developing unit 6. Accordingly, the position of the developing unit 6 can be restricted more precisely. It can also be understood from FIGS. 1A and 1B that when the developing unit 6 is at the separated position and the contact position, the bearing restricting portion 34*d* is located below the rotational axis of the developing unit 6 in the vertical direction. Further, the restricting portion 5*d* is disposed below the bearing restricting portion 34*d*. Thus, the restricting portion 5*d* can support the bearing restricting portion 34*d* in a stable manner.

Figure 8:
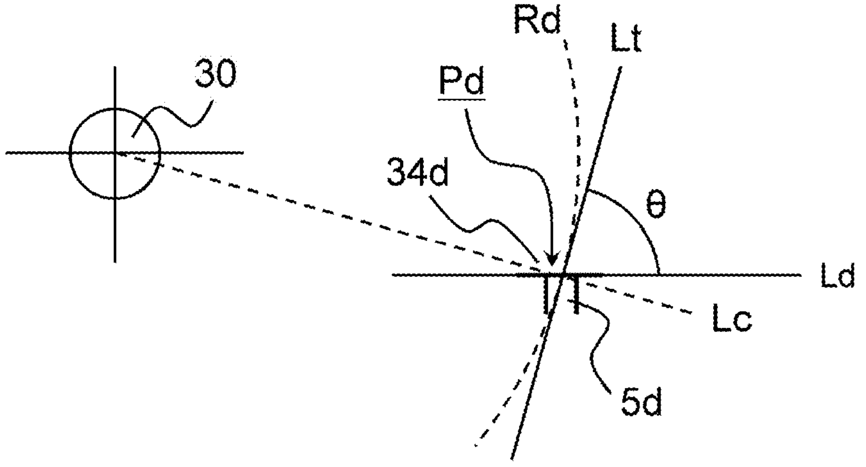
FIG. 8 is a diagram for describing a placement of a bearing restricting portion and a restricting portion.

Now, the placement of the bearing restricting portion 34*d* and the restricting portion 5*d* will be described in further detail with reference to FIG. 8. FIG. 8 is a diagram describing the placement of the bearing restricting portion 34*d* and the restricting portion 5*d*. FIG. 8 illustrates a state where the developing unit 6 is at the separated position, as viewed along the rotational axis of the developing unit 6.

A point where the bearing restricting portion 34*d* and the restricting portion 5*d* come into contact will be referred to as contact point Pd, as illustrated in FIG. 8. A line in contact with the bearing restricting portion 34*d* and the restricting portion 5*d* at the contact point Pd will be referred to as line (first line) Ld. Conversely, a line that passes through the contact point Pd and the rotational axis of the developing unit 6 will be referred to as line Lc, and a line that is orthogonal to the line Lc and passes through the contact point Pd will be referred to as line (second line) Lt. The bearing restricting portion 34*d* is movable along a circle Rd that has the rotational axis of the developing unit 6 as the center thereof and that passes through the contact point Pd. The line Lt agrees with the direction of movement of the bearing restricting portion 34*d* in the state illustrated in FIG. 8, and agrees with the tangent of the circle Rd at the contact point Pd. The angle θ between the line Lt and the line Ld preferably is close to 90° in order to precisely position the bearing restricting portion 34*d*. Accordingly, the angle θ between the line Lt and the line Ld preferably is more than or equal to 45° and less than or equal to 135°, and more preferably is more than or equal to 60° and less than or equal to 120°. In the present embodiment, the angle θ between the line Lt and the line Ld is approximately 75°.

As described above, the drum unit 4 that is the first unit has the photosensitive drum 7 and the restricting portion 5*d* that is a first portion, and the developing unit 6 that is the second unit has the developing roller 11 and the bearing restricting portion 34*d* that is a second portion. The developing unit 6 is movable between a first position and a second position. The first position is a position of the developing unit 6 when the developing roller 11 is in contact with the photosensitive drum 7. The second position is a position of the developing unit 6 when the developing roller 11 is separated from the photosensitive drum 7, and the bearing restricting portion 34*d* is in contact with the restricting portion 5*d*. The developing unit 6 moves from the first position to the second position by predetermined urging force. Accordingly, the developing roller 11 and the photosensitive drum 7 are separated, so the developing roller 11 and the photosensitive drum 7 can be prevented from being in contact, even in a case where the process cartridge 1 is left standing for a long period of time. The predetermined urging force includes urging force due to the own weight of the developing unit 6. In a case where the developing unit 6 is located at the second position, the movement of the developing unit 6 in the direction where the developing roller 11 is distanced from the photosensitive drum 7 is restricted by the bearing restricting portion 34*d* coming into contact with the restricting portion 5*d*. Accordingly, the separated state where the developing roller 11 and the photosensitive drum 7 are separated is maintained in a state where the process cartridge 1 is removed from the apparatus main body 100*a*, and the distance between the developing roller 11 and the photosensitive drum 7 can be maintained constant.

Second Embodiment

Figure 7:
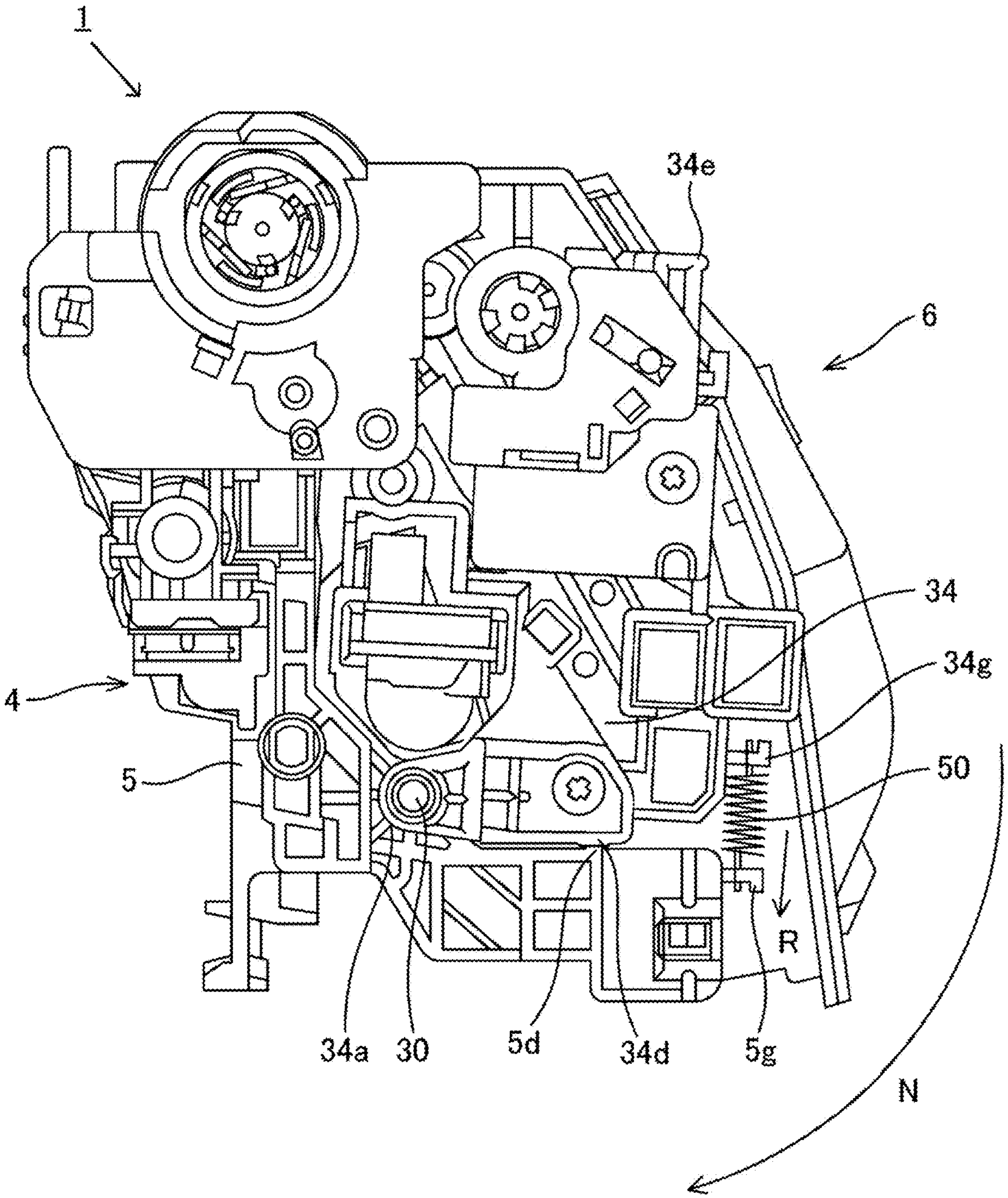
FIG. 7 is a side view of a process cartridge in a separated state.

Next, a second embodiment of the present invention will be described with reference to FIG. 7. FIG. 7 is a side view of the process cartridge 1 in a state where the developing roller 11 and the photosensitive drum 7 are separated. Portions of the second embodiment which differ from the first embodiment will be described in detail. Unless specifically stated otherwise, materials, shapes, processes, and so forth, are the same as in the first embodiment. Elements with functions and configurations which are the same as or equivalent to those of the process cartridge 1 in the first embodiment are denoted by the same symbols, and detailed description will be omitted.

A boss 34*g* is provided on one end of the developing bearing 34 in the longitudinal direction, and a boss 5*g* is provided on one end of the drum frame 5 in the longitudinal direction. The process cartridge 1 is provided with a tension spring 50, which is an urging portion. One end of the tension spring 50 is attached to the boss 5*g* (first protruding portion) on the drum frame 5, and the other end of the tension spring 50 is attached to the boss 34*g* (second protruding portion) provided to the developing bearing 34. Thus, the tension spring 50 engages the boss 34*g* and the boss 5*g*. The tension spring 50 is stretched in the contact state where the pressure-applying lever 101 is urging the developing bearing 34 (FIGS. 1B and 6B) and the developing roller 11 and the photosensitive drum 7 are in contact. When the pressure-applying levers 101 moves in the retracting direction (FIGS. 1A and 6A), the restoring force of the tension spring 50 generates urging force with regard to the developing unit 6 in the direction of arrow R. Moment causing the developing unit 6 to be rotated in the direction of arrow N with respect to the drum unit 4 is generated by the urging force applied to the developing unit 6 by the tension spring 50 and the own weight of the developing unit 6 described in the first embodiment (direction of arrow W in FIG. 6A). Thus, the developing unit 6 moves to the separated position.

In the same way as in the first embodiment, even in a case where the process cartridge 1 is left standing for a long period of time in a state where the process cartridge 1 is removed from the apparatus main body 100*a*, permanent deformation of the elastic layer of the developing roller 11 due to contact between the developing roller 11 and the photosensitive drum 7 can be suppressed.

Now, in the present embodiment, the direction of moment around the rotation supporting pin 30 due to the urging force of the tension spring 50 and the own weight of the developing unit 6 is a direction that causes the developing unit 6 to move in the direction of arrow N with respect to the drum unit 4. Regardless of whether the direction of the urging force of the tension spring 50 (direction of arrow R in FIG. 7) agrees with or is different from the direction from above toward below in the vertical direction (direction of gravity), the direction of moment around the rotation supporting pin 30 due to the urging force of the tension spring 50 is the direction of arrow N in FIG. 6A.

The direction of moment due to the urging force of the tension spring 50 and the direction of moment due to the own weight of the developing unit 6 may be the same. Also, the direction of moment due to the own weight of the developing unit 6 and the direction of moment due to the tension spring 50 may be different. For example, in a case where the developing unit 6 is positioned above the drum unit 4 in the vertical direction, the direction of moment around the rotation supporting pin 30 due to the own weight of the developing unit 6 may be the direction of arrow M in FIG. 6B. In the present embodiment, the magnitude of the urging force of the tension spring 50 is set so that the direction of summed moments around the rotation supporting pin 30 is the direction of arrow N in FIG. 6A. Accordingly, even in a case where the direction of moment due to the own weight of the developing unit 6 and the direction of moment due to the tension spring 50 are conflicting, for example, the developing unit 6 rotates in the direction of arrow N in FIG. 7 with respect to the drum unit 4.

In the same way as in the first embodiment, the developing unit 6 moves from the first position to the second position due to predetermined urging force. The first position is a position of the developing unit 6 when the developing roller 11 is in contact with the photosensitive drum 7. The second position is a position of the developing unit 6 when the developing roller 11 is separated from the photosensitive drum 7, and the bearing restricting portion 34*d* is in contact with the restricting portion 5*d*. In a case where the direction of moment due to the own weight of the developing unit 6 and the direction of moment due to the tension spring 50 are conflicting, for example, the predetermined urging force is the urging force acting on the developing unit 6 due to the tension spring 50. In a case where the direction of moment due to the own weight of the developing unit 6 and the direction of moment due to the tension spring 50 agree, the predetermined urging force includes, for example, the urging force due to the own weight of the developing unit 6 and the urging force acting on the developing unit 6 due to the tension spring 50.

The tension spring 50 may be disposed at one end of the process cartridge 1 in the longitudinal direction, or the tension spring 50 may be disposed at the middle of the process cartridge 1 in the longitudinal direction. Alternatively, two tension springs 50 may be disposed, one on either end of the process cartridge 1 in the longitudinal direction.

Also, the tension spring 50 is not limiting, and the same advantages can be obtained using a compression spring or a torsion coil spring, as long as the configuration is a configuration where moment is generated that causes the developing unit 6 to rotate with respect to the drum unit 4 in a direction where the developing roller 11 is separated from the photosensitive drum 7.

The posture of the drum unit 4 when removing the process cartridge 1 from the apparatus main body 100*a* (removal posture), and the posture of the drum unit 4 when image forming operations are performed, have been described above as being the same. However, the posture of the drum unit 4 when removing the process cartridge 1 from the apparatus main body 100*a* (removal posture), and the posture of the drum unit 4 when image forming operations are performed, may be different. In this case, it is sufficient for the developing unit 6 to be positioned at the separated position by the own weight of the developing unit 6 when the drum unit 4 takes the removal posture.

According to the present invention, a cartridge can be provided in which the image bearing member and the developer bearing member are easily separated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-168869, filed on Sep. 17, 2019, and Japanese Patent Application No. 2020-129837, filed on Jul. 31, 2020, which are hereby incorporated by reference herein in their entirety.

What is claimed is:

1. A printer cartridge comprising:

a drum unit including a photosensitive drum, a first drum bearing supporting the photosensitive drum so that the photosensitive drum is rotatable, and a drum frame to which the first drum bearing is attached;

a developing unit including a developing roller, a first developing bearing supporting the developing roller so that the developing roller is rotatable, a developing frame to which the first developing bearing is attached, the developing frame provided with a chamber in which developer is accommodated, wherein the developing unit is rotatably connected to the drum unit and configured to be rotatable relative to the drum unit about a rotational axis between:

a first posture where the developing roller is in contact with the photosensitive drum; and a second posture where the developing roller is separated from the photosensitive drum, wherein the drum frame includes an extending portion extending in a direction of the rotational axis and a first projection projecting from the extending portion toward a direction orthogonal to the direction of the rotational axis, the first projection being connected to a first end of the extending portion with respect to the direction of the rotational axis, and wherein when the developing unit is in the second posture, the first developing bearing is received by the first projection so that movement of the developing unit in a separation direction where the developing roller is distanced from the photosensitive drum is restricted.

2. The printer cartridge according to claim 1, further comprising:

a first pin;

wherein the first developing bearing is provided with a first hole, and the drum frame is provided with a second hole, and wherein the first pin is inserted into the first hole and the second hole so that the developing unit is rotatably connected to the drum unit.

3. The printer cartridge according to claim 2, wherein the drum unit includes a second drum bearing supporting the photosensitive drum so that the photosensitive drum is rotatable, and the developing unit includes a second developing bearing supporting the developing roller so that the developing roller is rotatable, and wherein the second drum bearing is attached to the drum frame, and the second developing bearing is attached to the developing frame.

4. The printer cartridge according to claim 3, further comprising:

a second pin;

wherein the second developing bearing is provided with a third hole, and the drum frame provided with a fourth hole, and wherein the second pin is inserted into the third hole and the fourth hole so that the developing unit is rotatably connected to the drum unit.

5. The printer cartridge according to claim 1, wherein the drum unit includes a second drum bearing supporting the photosensitive drum so that the photosensitive drum is rotatable, and the developing unit includes a second developing bearing supporting the developing roller so that the developing roller is rotatable, and wherein the second drum bearing is attached to the drum frame, and the second developing bearing is attached to the developing frame.

6. The printer cartridge according to claim 1, wherein the drum unit includes a charging roller contacting the photosensitive drum, and the developing unit includes a receiving portion configured to receive an external force, wherein, in a state where the drum unit is in a predetermined posture and the developing unit is in the first posture, the developing unit moves by its own weight to the second posture in a state where the external force is removed from the receiving portion, and wherein in a state where the drum unit is in the predetermined posture, the photosensitive drum is disposed higher than the rotational axis, and the charging roller is disposed lower than the photosensitive drum with respect to a vertical direction.

7. The printer cartridge according to claim 1, wherein, as viewed in the direction of the rotational axis, the first projection overlaps the developing frame.

8. The printer cartridge according to claim 1, wherein the drum frame includes a second projection projecting from the extending portion toward the direction orthogonal to the direction of the rotational axis, the second projection being connected to a second end of the extending portion opposite to the first end of the extending portion with respect to the direction of the rotational axis.

* * * * *